(12) United States Patent
Hall et al.

(10) Patent No.: US 11,993,363 B2
(45) Date of Patent: May 28, 2024

(54) METHODS AND APPARATUSES FOR A PORTABLE COCKPIT SEAT

(71) Applicant: BETA AIR, LLC, South Burlington, VT (US)

(72) Inventors: Edward Hall, South Burlington, VT (US); Charles Camron Guthrie, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/734,018

(22) Filed: Apr. 30, 2022

(65) Prior Publication Data

US 2023/0348065 A1    Nov. 2, 2023

(51) Int. Cl.
| | |
|---|---|
| *B64D 11/06* | (2006.01) |
| *B64C 13/04* | (2006.01) |
| *G09B 9/28* | (2006.01) |
| *G09B 9/30* | (2006.01) |
| *B64C 29/00* | (2006.01) |

(52) U.S. Cl.
CPC ...... *B64C 13/0421* (2018.01); *B64D 11/0639* (2014.12); *B64D 11/0689* (2013.01); *G09B 9/28* (2013.01); *G09B 9/30* (2013.01); *B64C 29/0025* (2013.01)

(58) Field of Classification Search
CPC .............................. B64D 11/0689; G09B 9/08
See application file for complete search history.

(56) References Cited

U.S. PATENT DOCUMENTS

| | | | |
|---|---|---|---|
| 6,813,595 B2 | 11/2004 | Edgar | |
| 9,583,019 B1 | 2/2017 | Schwartz et al. | |
| 10,413,815 B2 | 9/2019 | Ergen | |
| 10,529,248 B2 | 1/2020 | Chavez et al. | |
| 2014/0131523 A1* | 5/2014 | Carner | B64C 13/044 244/235 |
| 2014/0272809 A1* | 9/2014 | Martel | G09B 9/30 434/38 |
| 2016/0320559 A1* | 11/2016 | Richards | G02B 6/32 |

(Continued)

OTHER PUBLICATIONS

Bisimulations, Bisim to Demonstrate VR Flight Simulator at ITEC 2016 and Sea Air Space 2016 to Support Anytime, Anywhere Training, Jun. 12, 2016.

(Continued)

*Primary Examiner* — Nicholas McFall
(74) *Attorney, Agent, or Firm* — Brake Hughes Bellermann LLP

(57) ABSTRACT

A portable cockpit seat apparatus, the apparatus including a portable cockpit seat, wherein the portable cockpit seat includes a hinge and has a stowed position, wherein the portable cockpit seat is folded about the hinge. The apparatus further including a headset including a display, and at least a flight control communicatively connected to the headset. The headset configured to and display a cockpit view of an aircraft. The flight control of the at least a flight control is connected to the portable cockpit seat and the at least a flight control, in response to actuation by a user, is configured to send a thrust signal, wherein the thrust signal causes the aircraft to alter its thrust and send a lift signal, wherein the lift signal causes the aircraft to alter its lift.

19 Claims, 8 Drawing Sheets

(56) References Cited

U.S. PATENT DOCUMENTS

2018/0319482 A1* 11/2018 Wong ..................... B64D 31/04
2019/0130781 A1* 5/2019 Nissen ..................... G09B 9/12
2019/0244537 A1* 8/2019 Liberatore ........... G02B 27/017
2020/0333805 A1* 10/2020 English ............... B64C 13/0421

OTHER PUBLICATIONS

Next Level Racing, Flight Simulator Lite, Dec. 16, 2021.
Will Smith, How VR is Transforming the Future of Aviation Training, Jan. 22, 2019.
Yaw Motion Simulator, FlightSimExpo—Sep. 24-26, 2021—San Diego, Sep. 26, 2021.
Protobox LLC, NextGen Portable Flight Simulator, Dec. 16, 2021.
U/ThereIsOnlyOne, Portable cockpit, May 31, 2021.
Hammacher Schlemmer, The Cockpit Flight Simulator, Dec. 16, 2021.

* cited by examiner

US 11,993,363 B2

METHODS AND APPARATUSES FOR A PORTABLE COCKPIT SEAT

FIELD OF THE INVENTION

The present invention generally relates to the field of portable simulators. In particular, the present invention is directed to methods and apparatuses for a portable cockpit seat.

BACKGROUND

Immersive flight simulators can be prohibitively expensive. Particularly, the screens and projectors can contribute significantly to this cost. This makes it expensive and inconvenient for pilots to gain simulator experience. Additionally, flight simulators can be very hard to move between location. Existing solutions do not adequately solve these problems.

SUMMARY OF THE DISCLOSURE

In an aspect, a portable cockpit seat apparatus, the apparatus including a portable cockpit seat, wherein the portable cockpit seat comprises a hinge and the portable cockpit seat has a stowed position, wherein the portable cockpit seat is folded about the hinge; The apparatus also including a headset including a display and configured to display a cockpit view of an aircraft and at least a flight control communicatively connected to the headset. The flight control of the at least a flight control is connected to the portable cockpit seat and the at least a flight control, in response to actuation by a user, is configured to send a thrust signal, wherein the thrust signal causes the aircraft to alter its thrust and send a lift signal, wherein the lift signal causes the aircraft to alter its lift.

In another aspect a method for a portable cockpit seat, the method including changing the portable cockpit seat from a stowed position to an unstowed position. The method further including receiving a lift signal from at least a flight control connected to a portable cockpit seat, wherein the lift signal is caused by actuation of the at least a flight control by a user. The method further including receiving a thrust signal from the at least a flight control, wherein the thrust signal is caused by actuation of the at least a flight control by the user. The method also including inputting the lift signal into an aircraft simulation and inputting the thrust signal into an aircraft simulation. The method furthermore including displaying the aircraft simulation on a headset, wherein the headset is configured to display a cockpit view of an aircraft, wherein the movement of the aircraft is a result of the aircraft simulation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for a portable cockpit seat apparatus. In an embodiment, the portable cockpit seat may have a collapsed position and an un-collapsed position. The collapsed position may allow for the portable cockpit seat to be easily transferred. The un-collapsed position may allow for a user to use the portable cockpit seat.

In aspects of the present disclosure, at least a flight control may be used to interface with an aircraft simulation. The simulation may be displayed on a headset. In some aspects, the headset may be a virtual reality headset. In some embodiments, the headset may be an augmented reality headset. In some embodiments, the headset may display a fully virtual cockpit view. However, in some aspects the headset may overlay a view of the portable cockpit seat apparatus onto an aircraft simulation. Additionally, in other aspects, the headset may overlay a video feed from a real-world aircraft onto a virtual cockpit or onto a view of the portable cockpit seat apparatus.

U.S. application Ser. No. 17/527,301, filed Nov. 16, 2021, and entitled "SYSTEMS AND METHODS FOR A MOBILE FLIGHT SIMULATOR OF AN ELECTRIC AIRCRAFT," the entirety of which is hereby incorporated by reference. U.S. application Ser. No. 17/527,328, filed Nov. 16, 2021, and entitled "SYSTEMS AND METHODS FOR MODULAR MOBILE FLIGHT SIMULATOR FOR AN ELECTRIC AIRCRAFT," the entirety of which is hereby incorporated by reference. U.S. application Ser. No. 17/524, 355, filed Nov. 11, 2021, and entitled "SYSTEMS AND METHODS FOR SIMULATING AN ELECTRICAL VERTICAL TAKEOFF AND LANDING (EVTOL) AIRCRAFT," the entirety of which is hereby incorporate by reference.

Figure 1:
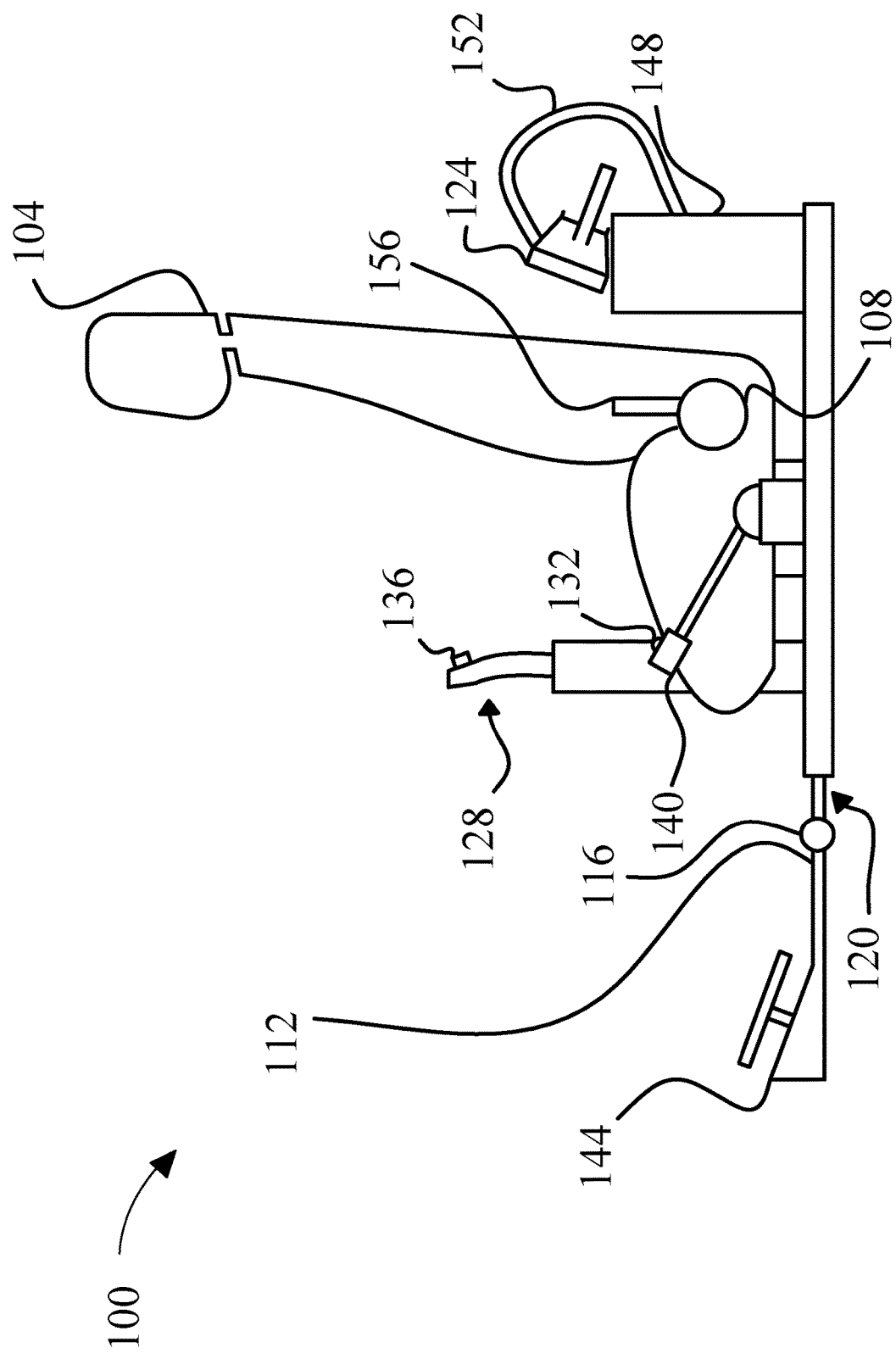
FIG. 1 is a depiction of an exemplary portable cockpit seat apparatus.

Referring now to FIG. 1, an exemplary embodiment of a portable cockpit seat apparatus 100 is depicted. Apparatus 100 includes a portable cockpit seat 104. For the purposes of this disclosure, a "portable cockpit seat" is a seat with a stowed position and an unstowed position, wherein the portable cockpit seat may be easily carried or moved when it is in the stowed position. Portable cockpit seat 104 includes hinge 108. For the purposes of this disclosure, a "hinge" is a jointed connection that connects two elements, such that the elements may rotate with respect two each other. As a non-limiting example, portable cockpit seat 104 may include a seat base and seat back, wherein the seat base and the seat back are connected by hinge 108. Portable cockpit seat 104 has a stowed position, wherein portable cockpit seat 104 is folded about the hinge. For the purposes of this disclosure, a "stowed position" of portable cockpit seat 104, is a position for portable cockpit seat 104, wherein portable cockpit seat 104 is adjusted such that it is in a position for transit. As a non-limiting example, when portable cockpit seat 104 is in the stowed position, the seat back may rotated downward until it is flush with the seat base. In some embodiments, portable cockpit seat 104 may have an unstowed position, wherein the portable cockpit seat is configured an arranged to allow a user to sit in it. As a non-limiting example, the user may sit on the seat base and lean back against the seat back. The user may be any human.

With continued reference to FIG. 1, in some embodiments, portable cockpit seat 104 may include a frame 112. Frame 112 may connect portable cockpit seat 104 to other components of apparatus 100. In some embodiments, frame 112 may be made of metal. As non-limiting examples, frame 112 may be made of aluminum, steel, magnesium, or the like. In some embodiments, frame 112 may be made of carbon fiber. In some embodiments, frame 112 may be made of plastic. A person of ordinary skill in the art, after having reviewed the entirety of this disclosure, would appreciate that frame 112 may be made from a variety of different materials depending on the strength, rigidity, cost, and the like, needed. Frame 112 may have a variety of cross-sectional shapes. As a non-limiting example, frame 112 may have a tube cross-section. As a non-limiting example, frame 112 may have a box cross-section. As a non-limiting example, frame 112 may have a rectangular cross-section. In some embodiments, frame 112 may have an irregular cross section. A person of ordinary skill in the art, after having reviewed the entirety of this disclosure, would appreciate that frame 112 may have a variety of cross sections and shapes depending on the structural and weight requirements of apparatus 100.

With continued reference to FIG. 1, in some embodiments, frame 112 may include a hinge, e.g. hinge 108. In some embodiments, the hinge of frame 112 may allow the portable cockpit seat 104 to transition from the stowed position to the unstowed position, or vice versa. As a non-limiting example, in the stowed position of portable cockpit seat 104, frame 112 may fold over on to itself using the hinge.

With continued reference to FIG. 1, apparatus 100, in some embodiments, may include a frame hinge 116. Frame hinge 116 may be consistent with any other hinge described as part of this disclosure. In some embodiments, frame hinge may be used to transition apparatus 100 between its stowed and unstowed positions. In some embodiments, frame hinge 116 may be a component of frame 112. As a non-limiting example, frame hinge 116 may allow a portion of frame 112 to fold. As a further non-limiting example, in the stowed position, a portion of frame 112, may be folded onto another portion of frame 112 or portable cockpit seat 104. This may, for example, reduce the footprint of apparatus 100, so that apparatus 100 and/or portable cockpit seat 104 are easier to transport. Furthermore, as another non-limiting example, in the stowed position, a portion of frame 112, may be folded, using frame hinge 116, such that the portion of frame 112 is flush with another portion of frame 112.

With continued reference to FIG. 1, portable cockpit seat 104 may include a variety of mechanisms that may be used to transition from the stowed position to the unstowed position. In some embodiments, portable cockpit seat 104 and/or frame 112 may include a collapsible section 120. A "collapsible section," for the purposes of this disclosure, is a portion or part of an element that is able to transition into a more compact configuration. As a non-limiting example, collapsible section 120 may be collapsed such that it is in a more compact configuration when portable cockpit seat 104 and/or apparatus 100 is in the stowed configuration. As a non-limiting example, collapsible section 120 may be extended such that it is in a less compact configuration when portable cockpit seat 104 and/or apparatus 100 is in the unstowed configuration. In some embodiments, portable cockpit seat 104 and/or apparatus 100 may include more than one collapsible section 120. In some embodiments, collapsible section 120 may include telescoping components. For the purposes of this disclosure, "telescoping components" are components that may slide in and out of each other, thereby shortening or lengthening the components. For example, when the telescoping components have slid into one another, collapsible section 120 may be considered to be collapsed. As another example, when the telescoping components are no longer inside of one another, collapsible section 120 may be considered to be extended. In some embodiments, collapsible section 120 may include a pantograph section. In some embodiments, collapsible section 120 may include a gusset component. For the purposes of this disclosure, a "gusset component" is a component including a piece of flexible material, whereby the flexible material allows the component to be expanded or contracted.

With continued reference to FIG. 1, apparatus 100 may include a headset 124. Headset 124 may, in some embodiments, be a virtual reality or mixed reality headset. A "virtual reality headset," for the purposes of this disclosure, is a head mounted device that displays virtual reality environments. For the purposes of this disclosure, a "mixed reality headset" is a head mounted device that displays environments comprised of both virtual and actual reality. For example, a mixed reality headset may display environments comprised of virtual reality components overlayed on a video feed of the real world. In some embodiments, headset 124 may be both a virtual reality headset and a mixed reality headset, meaning that it may be able to act as both a virtual reality headset and a mixed reality headset. In some embodiments, headset 124 may be able to toggle between a virtual reality mode, wherein headset 124 acts as a virtual reality headset, and an augmented reality mode, wherein headset 124 acts as an augmented reality headset.

With continued reference to FIG. 1, headset includes a display. The display may be, as non-limiting examples, an OLED display, an LCD display, a retinal projection display, and the like. The display may have a variety of resolutions. As a non-limiting example, the display may be 1080p. As another non-limiting example, the display may be 1440p. As yet another example, the display may be 4 k. Higher resolutions may also be desirable in order to eliminate the pixelation effect. For example, resolutions of up to 8 k and beyond, per eye, may be desirable in order to limit the pixelation effect that a user sees when looking at the display. A person of ordinary skill in the art, after having reviewed the entirety of this disclosure, would appreciate that a wide variety of types of displays and resolutions could be used for the display depending on the price and performance desired. Headset 124 is configured to display a cockpit view of an aircraft. For the purposes of this disclosure, a "cockpit view" is the view that a pilot would have when sitting in the cockpit and looking towards the front cockpit window. The cockpit view is discussed further with respect to FIG. 2.

With continued reference to FIG. 1, at least a flight control is communicatively connected to headset 124. "Communicatively connected," for the purpose of this disclosure, means connected such that data can be transmitted, whether wirelessly or wired. For the purposes of this disclosure, a "flight control" is a device that a pilot may use in order to change the attitude, speed, direction, and the like. A flight control of the at least a flight control is connected to portable cockpit seat 104. As a non-limiting example, a flight control of the at least a flight control may be directly connected to portable cockpit seat 104. As a non-limiting example, a flight control of the at least a flight control may be indirectly connected to portable cockpit seat 104. For the purposes of this disclosure, a first component is indirectly connected to a second component, when the first component is connected to the second component through at least a third component. As a non-limiting example, a flight control of the at least a flight control may be removably connected to portable cockpit seat 104. For the purposes of this disclosure, "removably connected" means connected to an object such that it may be removed without damaging the object.

With continued reference to FIG. 1, the flight control may include an inceptor stick 128. The inceptor stick 128 may include a joystick. A "joystick," for the purposes of this disclosure, is a stick that pivots about a base and reports its angle with respect to the base. A pilot may control the aircraft by pivoting the joystick about its base. In some embodiments, the inceptor stick may be configured to control the aircrafts rotation about its principal axes (roll, pitch, and yaw). As a non-limiting example, pivoting the joystick forward may cause the aircraft to pitch downward; for example, by moving a control surface or altering the spin rate of at least a lift rotor. As a non-limiting example, pivoting the joystick backward may cause the aircraft to pitch upward for example, by moving a control surface or altering the spin rate of at least a lift rotor. As a non-limiting example, pivoting the joystick to the side may cause the aircraft to roll or yaw to that side; for example, by moving a control surface or altering the spin rate of at least a lift rotor. In some embodiments, inceptor stick 128 may be configured to control the thrust of the aircraft. For example, pivoting the joystick forward may increase the thrust of the aircraft. As a non-limiting example, the pivoting the joystick backward may cause the thrust of the aircraft to decrease. In some embodiments, inceptor stick 128 may be configured to control the aircraft's movement in the forward and transverse directions. As a non-limiting example, pivoting the joystick forward may cause the aircraft to move forward. As a non-limiting example, pivoting the joystick backward may cause the aircraft to move backward. As a non-limiting example, pivoting the joystick to either side may cause the aircraft to move to that side. In some embodiments, inceptor stick 128 may include a thrust dial 132. For the purposes of this disclosure, a "thrust dial" is a dial that can adjust the thrust of the aircraft up or down depending on the direction that it is rotated in. For example, rotating the thrust dial in a first direction may increase the thrust of the aircraft, whereas rotating the thrust dial in a second direction may decrease the thrust of the aircraft. In some embodiments, inceptor stick 128 may include a button 136. The button may cause an event to occur when it is pressed. As a non-limiting example, pressing button 136 may cause the landing gear of the aircraft to deploy or retract. As another non-limiting example, pressing button 136 may cause a headlight to turn on or off on the aircraft. A person of ordinary skill in the art, after having reviewed the entirety of this disclosure, would appreciate that a wide variety of functions may be assigned to button 136. In some embodiments, inceptor stick 128 may include more than one button 136.

With continued reference to FIG. 1, in some embodiments, the flight control may include a lift lever 140. For the purposes of this disclosure, a "lift lever" is a lever that is configured to rotate about a pivot point, wherein the rotation occurs about a single axis, and report its angle with respect to a reference position. In some embodiments, the lift lever may include a pivot point. In some embodiments, rotating the lift lever in a first direction may cause the speed of an at least a lift propulsor of the aircraft to increase, thereby creating additional lift. In some embodiments, rotating the lift lever in a second direction may cause the speed of the at least a lift propulsor of the aircraft to decrease, thereby decreasing the lift produced. In some embodiments, lift lever 140 may include a button 136. In some embodiments, lift lever 140 may include a thrust dial 132. In some embodiments, rotating the thrust dial 132 of lift lever 140 in a first direction may cause the thrust of the aircraft to increase. In some embodiments, rotating thrust dial 132 of lift lever 140 in a second direction causes the thrust of the aircraft to decrease. In some embodiments, lift lever 140 may include a detent or set of detents. For example, lift lever 140 may have a detent at the position of the lift lever 140, wherein the lift generated by the aircraft and the weight of the aircraft are equal in magnitude. That is to say that at the detent, the aircraft would hover absent external forces such as wind, downwash, updrafts, and the like.

With continued reference to FIG. 1, in some embodiments, the at least a flight control may include a set of yaw pedals 144. For the purposes of this disclosure, "yaw pedals" are pedals that can adjust an aircraft's yaw when they are actuated. In some cases, the set of yaw pedals 144 may be referred to as a set of rudder pedals. The set of yaw pedals 144, in some embodiments, may include a first yaw pedal and a second yaw pedal. The first yaw pedal may be configured to cause the aircraft to yaw in a first direction. This may be accomplished, as non-limiting examples, by adjusting the speed of some of the at least a lift propulsor, or by deflecting a rudder control surface. The second yaw pedal may be configured to cause the aircraft to yaw in a second direction. This may be accomplished, as non-limiting examples, by adjusting the speed of some of the at least a lift propulsor, or by deflecting a rudder control surface. In some embodiments, the first direction and the second direction may be opposite directions of rotation about the aircraft's yaw axis. In some embodiments, the set of yaw pedals 144 may include a brake component. In some embodiments, the brake pedal may be configured to engage and/or disengage brakes on the aircraft landing gear when it is engaged and/or disengaged by the pilot. As a non-limiting example, the brake pedal may be used to bring the aircraft to a stop when it is on the ground. In some embodiments, yaw pedals may be configured to send a yaw signal, wherein the yaw signal causes the aircraft to yaw (rotate about its yaw axis.

With continued reference to FIG. 1, in some embodiments, the at least a flight control may include a propulsor blade pitch control. In some embodiments, the propulsor blade pitch control may be a collective. In some embodiments, the propulsor blade pitch control may be configured to change the pitch angle of each blade on at least a lift propulsor, at the same time. In some embodiments, the propulsor blade pitch control may be a lever attached to a rotation point, wherein rotating the propulsor blade pitch control in one direction causes the pitch angle of the blades of the at least a lift rotor to decease and wherein rotating the propulsor blade pitch control in another direction causes the pitch angle of the blades of the at least a lift rotor to increase. In some embodiments, the propulsor blade pitch control may include at least a button 136. In some embodiments, propulsor blade pitch control may include a thrust dial 132.

With continued reference to FIG. 1, in some embodiments, the at least a flight control may include a yoke. In some cases, a yoke may be known as a control column or control wheel. A yoke may be used to control an aircraft's attitude, including, in various embodiments, its roll, pitch, and yaw. A person of ordinary skill in the art, after having reviewed the entirety of this disclosure, would appreciate that the at least a flight control may include a variety of different flight controls depending on the use-case presented and the systems sought to be controlled.

With continued reference to FIG. 1, the at least a flight control is configured to send a thrust signal in response to actuation by the user. As a non-limiting example, actuation by the user may include any of the actions using a flight control described above that a user or pilot may take to increase or decrease the thrust of the aircraft. In some embodiments, the thrust signal may cause the aircraft to alter its thrust. For the purposes of this disclosure, "thrust" is the force that moves the aircraft in the forward direction. In some embodiments, the thrust signal may cause a pusher propulsor of the aircraft to alter its rotation speed. As a non-limiting example, the thrust of the aircraft may be decreased when the rotation speed of the pusher propulsor is decreased. As a non-limiting example, the thrust of the aircraft may be increased when the rotation speed of the pusher propulsor is increased. The at least a flight control is also configured to send a lift signal, wherein the lift signal causes the aircraft to alter its lift. The lift signal may be sent in response to actuation by the user. As a non-limiting example, actuation by the user may include any of the actions using a flight control described above that a user or pilot may take to increase or decrease the lift of the aircraft. For the purposes of this disclosure, "lift" is the force generated by the aircraft that keeps the aircraft in the air. "Lift" may counteract the effects of gravity on the aircraft. In some embodiments, the lift signal may cause the rotation speed of at least a lift propulsor to decrease, thereby decreasing the lift generated. In some embodiments, the lift signal may cause the rotation speed of at least a lift propulsor to increase, thereby increasing the lift generated. In some embodiments, the lift signal may cause the pitch angle of the blades of the at least a lift propulsor to increase, thereby increasing the lift generated. In some embodiments, the lift signal may cause the pitch angle of the blades of the at least a lift propulsor to decrease, thereby decreasing the lift generated.

With continued reference to FIG. 1, in some embodiments, at least a flight control may include more than one flight control. In some embodiments, at least a flight control may include two flight controls. As a non-limiting example, this may include an inceptor stick 128 and a set of yaw pedals. In some embodiments, at least a flight control may include three flight controls. As a non-limiting example, as depicted in FIG. 1, at least a flight control may include an inceptor stick 128, a set of yaw pedals 144, and a lift lever 140. In some embodiments, at least a flight control may include more than three flight controls. In some embodiments, the at least a flight control may be consistent with any hover and forward thrust assembly disclosed in U.S. patent application Ser. No. 16/929,206, filed on Jul. 15, 2020, and titled "A HOVER AND THRUST CONTROL ASSEMBLY FOR DUAL-MODE AIRCRAFT," the entirety of which is hereby incorporated by reference. In some embodiments, the at least a flight control and/or inceptor stick 128 may be consistent with any hover and thrust control assembly disclosed in U.S. patent application Ser. No. 17/001,845, filed on Aug. 25, 2020, and titled "A HOVER AND THRUST CONTROL ASSEMBLY FOR DUAL-MODE AIRCRAFT," the entirety of which is hereby incorporated by reference.

With continued reference to FIG. 1, in some embodiments, apparatus 100 may include a computing device 148. Computing device 148 may be communicatively connected to headset 124. In some embodiments, computing device 148 may be communicatively connected to headset 124 using a cord 152. In some embodiments, computing device 148 may be communicatively connected to computing device 148 wirelessly. The wireless connection may use Bluetooth, WiFi, 3G, 4G, LTE, cellular data, radio, and the like.

Referring now to FIG. 1, computing device 148 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 148 may include a single computing device operating independently, or may include two or more computing device operating in concert, in parallel, sequentially or the like; two or more computing devices may be included together in a single computing device or in two or more computing devices. computing device 148 may interface or communicate with one or more additional devices as described below in further detail via a network interface device. Network interface device may be utilized for connecting computing device 148 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 148 may include but is not limited to, for example, a computing device or cluster of computing devices in a first location and a second computing device or cluster of computing devices in a second location. computing device 148 may include one or more computing devices dedicated to data storage, security, distribution of traffic for load balancing, and the like. computing device 148 may distribute one or more computing tasks as described below across a plurality of computing devices of computing device, which may operate in parallel, in series, redundantly, or in any other manner used for distribution of tasks or memory between computing devices. computing device 148 may be implemented using a "shared nothing" architecture in which data is cached at the worker, in an embodiment, this may enable scalability of apparatus 100 and/or computing device.

With continued reference to FIG. 1, computing device 148 may be designed and/or configured to perform any method, method step, or sequence of method steps in any embodiment described in this disclosure, in any order and with any degree of repetition. For instance, computing device 148 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 148 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing With continued reference to FIG. 1, in some embodiments, apparatus 100 may include a seat adjustment device 156. For the purpose of this disclosure, a "seat adjustment device" is a device that allows for the geometry of the portable cockpit seat to be adjusted. As non-limiting examples, the seat adjustment device may be a lever, dial, button, slider, and the like. Seat adjustment device may adjust any geometry of the seat. As a non-limiting example, seat adjustment device may allow the back of portable cockpit seat 104 to be tilted backwards and/or forwards. As another non-limiting example, seat adjustment device may allow the seat of portable cockpit seat 104 to be raised or lowered. In some embodiments, seat adjustment device 156 may allow the geometry of the frame to be adjusted. As a non-limiting example, seat adjustment device 156 may allow the geometry of the frame to be adjusted such that the set of yaw pedals 144 may be moved closer to and/or further from the seat component of portable cockpit seat 104.

Figure 2:
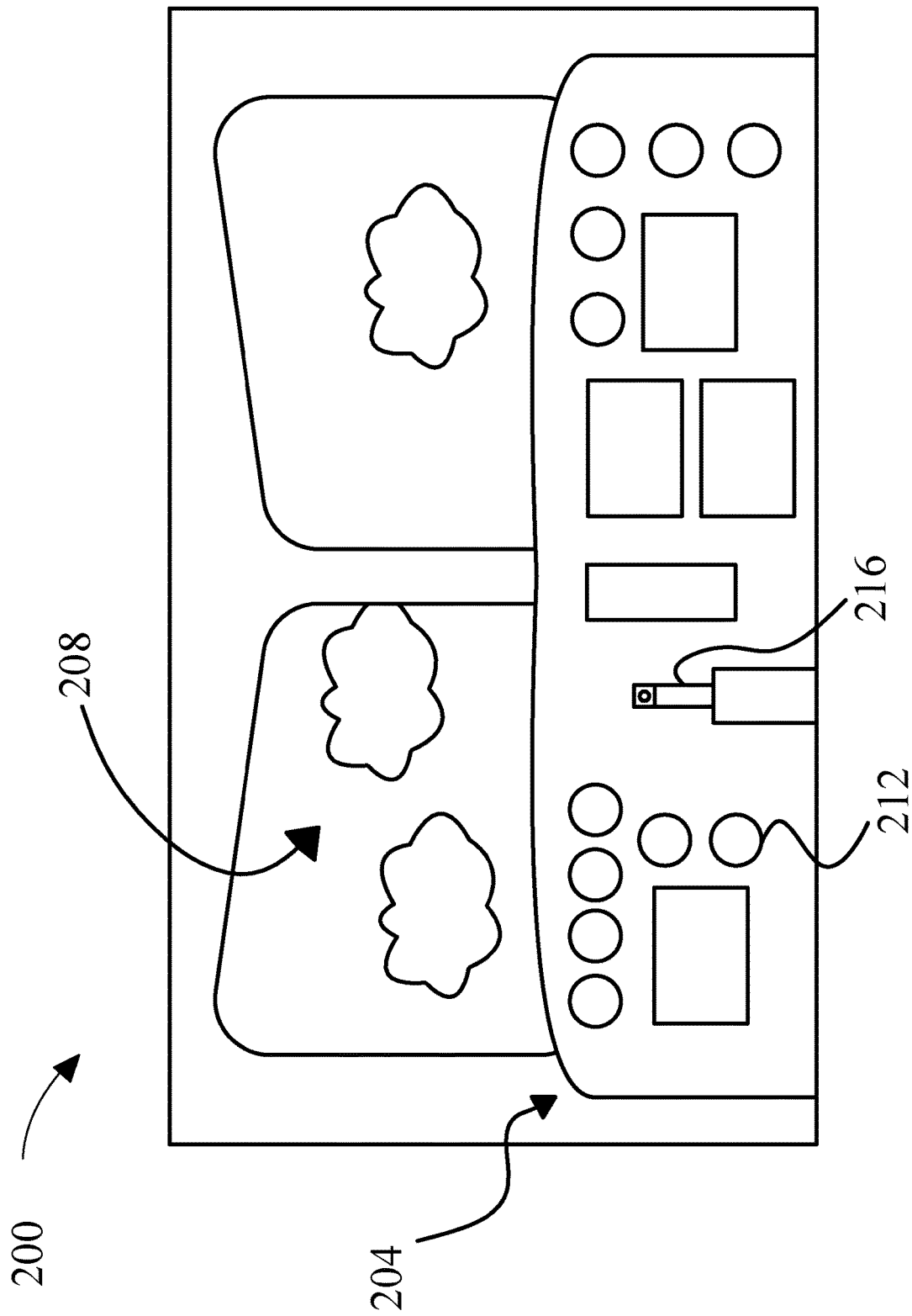
FIG. 2 illustrates an exemplary cockpit view.

Referring now to FIG. 2, an exemplary cockpit view 200 of an aircraft is shown. Headset 124 is configured to display a cockpit view of an aircraft. In some embodiments, this may be displayed on the display of headset 124.

With continued reference to FIG. 2, cockpit view 200 may be broadly broken into two components: cockpit 204 and exterior view 208. The cockpit 204 may include instruments 212 such as gages, meters, screens, readouts, and the like. As non-limiting example, instruments 212 may include an altimeter. an airspeed indicator, a vertical speed indicator, an attitude indicator, a heading indicator, a turn coordinator, a GPS, an energy remaining indicator, a temperature indicator, and the like. Cockpit 204 may also include at least a flight control 216, wherein the flight control may be consistent with any flight control disclosed as part of this disclosure.

With continued reference to FIG. 2, in some embodiments, headset 124 may be configured to display a virtual cockpit. In this case, cockpit 204 may be virtual. For the purposes of this disclosure, an object is "virtual" if it is the product of a computer simulation or computer rendering program. Thus, instruments 212 and the at least a flight control 216 may be virtual as well.

With continued reference to FIG. 2, in some embodiments, cockpit view 200 may include a first portion and a second portion. The first portion may include a view of the at least a flight control as discussed with respect to FIG. 1. This view of the at least a flight control may be received from a camera communicatively connected to headset 124 and/or computing device 148. In some embodiments, the camera may be attached to or part of headset 124 so as to capture images or video from the point of view of a user of apparatus 100. In some embodiments, the second portion may include a simulated exterior view. Mapping the first portion and the second portion onto FIG. 2, in some embodiments, first portion may be cockpit 204 and second portion may be exterior view 208. The simulated exterior view may be the product of a flight simulator, as discussed later.

With continued reference to FIG. 2, in some embodiments, it may be said that the aircraft is a simulated aircraft. This means that the movement and rendering of the aircraft is the product of a computer simulation. In some embodiments, the aircraft may be a real-life aircraft. In these embodiments, the aircraft may be communicatively connected to headset 124 and/or computing device 148. The commands entered by user using the at least a flight control may be relayed to the real-life aircraft. Additionally, computing device 148 may receive a video feed or other communication from real-life aircraft. The real-life aircraft and computing device 148 and/or headset 124 may wirelessly communicate using 3G, 4G, LTE, cellular data, satellite communication, radio, and the like. Thus, in some embodiments, the cockpit view 200 of headset 124 may include the video feed from the real lift aircraft as exterior view 208. In these embodiments, cockpit 204 may be a virtual cockpit or it may be a view of the at least a flight control.

Figure 3:
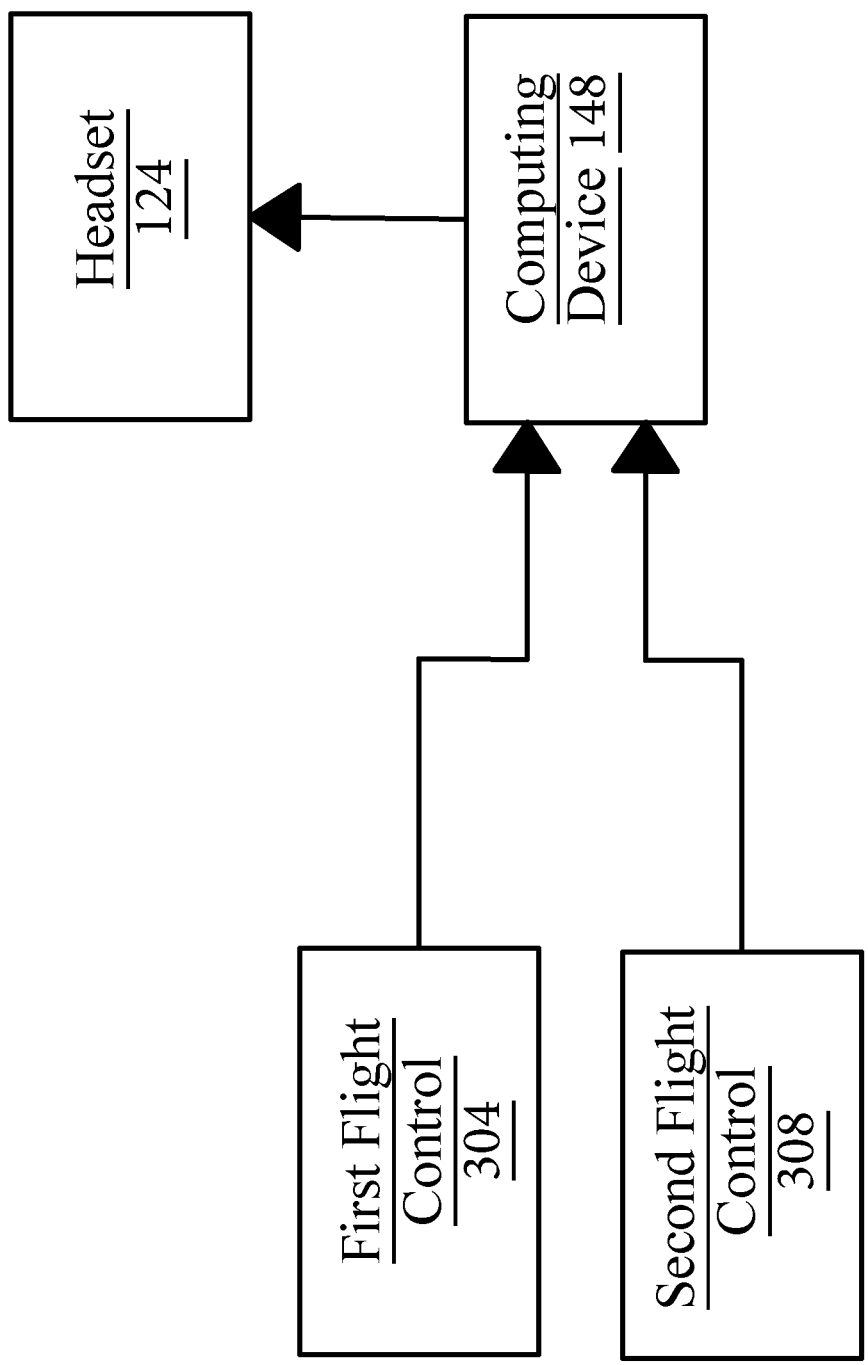
FIG. 3 is a block diagram of an exemplary control system for the apparatus.

Referring now to FIG. 3 a flow chart of a control system 300 for apparatus 100 is shown. System 300 includes computing device 148. Computing device 148 may be communicatively connected to headset 124. Computing device 148 may receive a lift signal from the at least a flight control. As a non-limiting example, computing device 148 may receive a lift signal from first flight control 304 and/or second flight control 308. The lift signal may be consistent with any lift signal disclosed in this disclosure. First flight control 304 and/or second flight control 308 may be consistent with any flight control disclosed as part of this disclosure. In some embodiments, computing device 148 may be configured to receive a thrust signal from the at least a flight control. As non-limiting examples, computing device 148 may receive a thrust signal from first flight control 304 and/or second flight control 308. Additionally, computing device 148 may be configured to receive any and all other control signals that a flight control may be configured to send.

With continued reference to FIG. 3, for ease of description, the thrust signal, lift signal, and any other signals that may be sent by a flight control may be referred to as "control signals." The computing device 148 may be configured to input these control signals into an aircraft simulation. As a non-limiting example, computing device 148 may be configured to input the lift signal into the aircraft simulation. As another non-limiting example, computing device 148 may be configured to input the thrust signal into the aircraft simulation. Additionally, computing device 148 may be configured to display the aircraft simulation on headset 124. In some embodiments, this may include displaying only a portion of the aircraft simulation on headset 124. In some embodiments, this displaying only a portion of a particular view from the aircraft simulation on headset 124.

With continued reference to FIG. 3, the aircraft simulation may be any aircraft simulation that meets the requirements discussed above. As non-limiting examples, the aircraft simulation may be X-Plane, Prepar3D, or Microsoft Flight Simulator. Additionally, the aircraft simulation may be a proprietary aircraft simulation. In some embodiment, the aircraft simulation may receive one or more inputs from computing device 148. These inputs may correspond to the control signals received by computing device 148. The simulation may then generate a simulation of an aircraft. This may include outputting a video feed of the aircraft simulation. The video feed may be from a variety of viewpoints, such as a cockpit view. A person of ordinary skill in the art would appreciate that a wide variety of aircraft simulations may be used with the present disclosure, depending on the accuracy, features, availability, and cost required.

Figure 4:
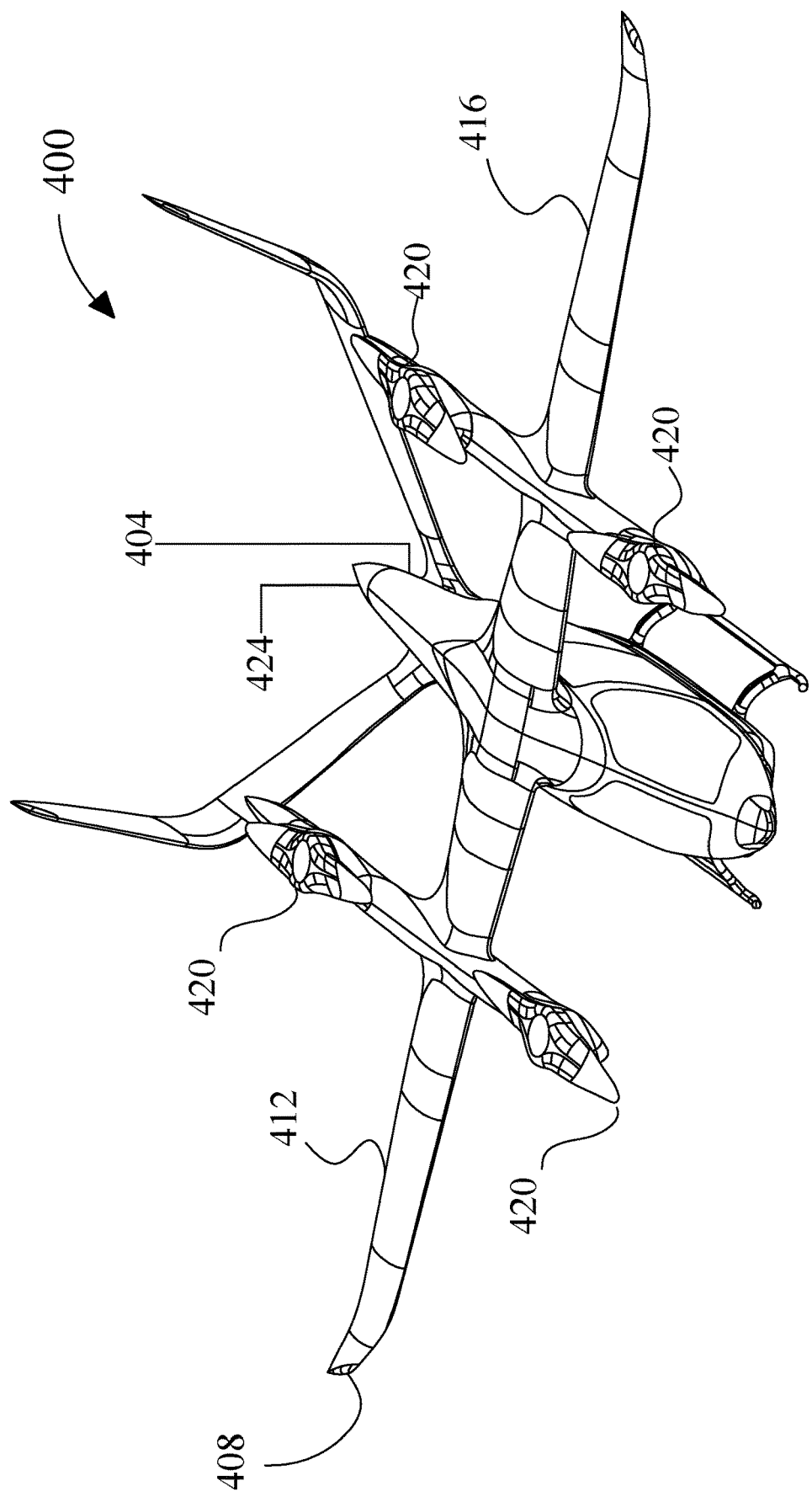
FIG. 4 is an illustration of an exemplary aircraft.

Referring now too FIG. 4, the aircraft, as discussed above, may be consistent with aircraft 400 in FIG. 4. The aircraft 400 may be a real-life aircraft, or it may be an aircraft simulation. For example, an aircraft simulation may run a mathematical model meant to simulate the components of aircraft 400 so that the simulation behaves as if it was a real-life aircraft. Aircraft 400 is described below as a real-life aircraft, however, one of ordinary skill in the art, after having the opportunity to review the entirety of this disclosure, would appreciate that aircraft 400 may be a simulated aircraft in an aircraft simulation.

With continued reference to FIG. 4, an exemplary embodiment of an aircraft 400 is illustrated. Aircraft 400 may include an electrically powered aircraft. In some embodiments, electrically powered aircraft may be an electric vertical takeoff and landing (eVTOL) aircraft. Aircraft 400 may be capable of rotor-based cruising flight, rotor-based takeoff, rotor-based landing, fixed-wing cruising flight, conventional takeoff, conventional landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft flies using wings and/or foils to generate lift caused by the aircraft's forward airspeed and the shape of the wings and/or foils.

In an embodiment, and still referring to FIG. 4, aircraft 400 may include a fuselage 404. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 404 may comprise structural elements that physically support the shape and structure of an aircraft. Structural elements may take a plurality of forms, alone or in combination with other types. Structural elements may vary depending on the construction type of aircraft and specifically, the fuselage. Fuselage 404 may comprise a truss structure. A truss structure is often used with a lightweight aircraft and includes welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 404 may comprise geodesic construction. Geodesic structural elements may include stringers wound about formers (which may be alternatively called station frames) in opposing spiral directions. A stringer, as used herein, is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 404 orthogonal to the longitudinal (nose to tail) axis of the aircraft and forms the general shape of fuselage 404. A former may comprise differing cross-sectional shapes at differing locations along fuselage 404, as the former is the structural element that informs the overall shape of a fuselage 404 curvature. In embodiments, aircraft skin can be anchored to formers and strings such that the outer mold line of the volume encapsulated by the formers and stringers includes the same shape as electric aircraft when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 4, fuselage 404 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

Still referring to FIG. 4, fuselage 404 may include a semi-monocoque construction. Semi-monocoque construction, as used herein, is a partial monocoque construction, wherein a monocoque construction is describe above detail. In semi-monocoque construction, fuselage 404 may derive some structural support from stressed aircraft skin and some structural support from underlying frame structure made of structural elements. Formers or station frames can be seen running transverse to the long axis of fuselage 404 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 4, it should be noted that an illustrative embodiment is presented only, and this disclosure in no way limits the form or construction of electric aircraft. In embodiments, fuselage 404 may be configurable based on the needs of the aircraft per specific mission or objective. The general arrangement of components, structural elements, and hardware associated with storing and/or moving a payload may be added or removed from fuselage 404 as needed, whether it is stowed manually, automatedly, or removed by personnel altogether. Fuselage 404 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 404 may also be configurable to accept certain specific cargo containers, or a receptable that can, in turn, accept certain cargo containers.

Still referring to FIG. 4, fuselage 404 may include an electrical energy source. An "electrical energy source," for the purposes of this disclosure, is a store of electric power. In some embodiments, the electrical energy source includes a plurality of electrical energy source modules, wherein each of the electrical energy source modules comprise a plurality of batteries connected in series. Configuration of an energy source containing connected modules may be designed to meet an energy or power requirement and may be designed to fit within a designated footprint in an electric aircraft in which electric aircraft may be incorporated. As a non-limiting example, electrical energy source may include lithium-ion battery cells.

With continued reference to FIG. 4, in some embodiments, may include a fuel storage system. A "fuel storage system" is a system configured to store and supply fuel to components of aircraft 400. Fuel storage system may be located, as a non-limiting example in fuselage 404. Fuel storage system may include a fuel tank. For the purposes of this disclosure, a "fuel tank" is a container designed to hold fuel. the fuel tank may contain fuel. As a non-limiting example, the fuel tank may contain aviation fuel. As a non-limiting example, aviation fuel may include jet fuel such as Jet A-1 and Jet B. As a non-limiting example, aviation fuel may include unleaded kerosene or naphtha-kerosene. As a non-limiting example, aviation fuel may include gasoline suitable for the aviation context. In some embodiments, the fuel tank may contain gasoline. In some embodiments, the fuel tank may include diesel. In some embodiments, the fuel tank may contain hydrogen gas. A person of ordinary skill in the art, after having reviewed the entirety of this disclosure, would understand that the fuel contained in fuel tank must the power unit for which it is intended in order to ensure operability.

With continued reference to FIG. 4, the fuel tank may be in fluid communication with a power unit. A "power unit," for the purposes of this disclosure, is a machine configured to generate electrical power or motive power using fuel. In some embodiments, the power unit may use fuel to create motive power and then use that motive power to generate electrical power. As a non-limiting example, in some embodiments, the power unit may include a turbine generator or engine. As a non-limiting example, in some embodiments, the power unit may include a reciprocating engine. As a non-limiting example, in some embodiments, the power unit may include a fuel cell engine. As a non-limiting example, in some embodiments, the power unit may include a fuel reformer.

In some embodiments, fuel storage system may include a fuel line. The fuel line may be in fluid communication with the power unit and the fuel tank. The fuel line may be a hose, tube, conduit, and the like. In some embodiments, fuel storage system may include a fuel pump. The fuel pump may be configured to pump fuel from the fuel tank to the power unit. In some embodiments, the fuel storage system may include a fuel valve. A "valve," for the purposes of this disclosure, is a device for restricting or otherwise controlling the flow of a liquid, gas, or fluid. In some embodiments, fuel valve may control the flow of fuel between the fuel tank and the power unit. In some embodiments, fuel valve may include a gate valve. In some embodiments, fuel valve may include a solenoid-operated valve. In some embodiments, fuel valve may include a spray valve.

Still referring to FIG. 4, aircraft 400 may include a laterally extending element 408, wherein the laterally extending element is attached to fuselage 404. As used in this disclosure a "laterally extending element" is an element that projects laterally from fuselage, including an outrigger, a spar, and/or a fixed wing that extends from fuselage. Laterally extending element 408 may project laterally from fuselage 404. In some embodiments, some portions of laterally extending element may have an airfoil shaped cross-section. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry includes an airfoil. An "airfoil" as used in this disclosure is a shape designed such that a fluid flowing over it exerts differing levels of pressure against the top and bottom surface. This pressure differential creates lift when the fluid flowing over the lower surface creates a higher pressure than the fluid flowing over the upper surface. An airfoil may have a leading edge and a trailing edge. As used in this disclosure a "leading edge" is a foremost edge of an airfoil that first intersects with the fluid medium. The "trailing edge" is the back end of the airfoil and is the last point on the airfoil that the fluid medium comes in contact with. Airfoils may have a centerline, wherein the centerline is the locus of points halfway between the top and bottom surface of the airfoil. Thus, for a symmetrical airfoil, the centerline is a straight line from the leading edge to the trailing edge. Airfoils may also have a chord line, wherein the chord line is a straight line from the leading edge to the trailing edge. Accordingly, for a symmetric airfoil, the chord line and the centerline are identical. The position of an airfoil may be described using an angle of attack. An angle of attack is the angle between the chord line of the airfoil and the direction of the oncoming flow of the fluid. Many airfoils create lift at an angle of attack of zero; however, symmetric airfoils do not create lift at an angle of attack of zero. Symmetric airfoils create lift when the angle of attack is greater than zero and create downforce when the angle of attack is less than zero. In an embodiment, and without limitation, wing may include a leading edge. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. In an embodiment, and without limitation, trailing edge may include an edge capable of controlling the direction of the departing external medium from the wing, such that a controlling force is exerted on the aircraft. Laterally extending element 408 may comprise differing and/or similar cross-sectional geometries over its cord length or the length from wing tip to where wing meets the aircraft's body. One or more wings may be symmetrical about the aircraft's longitudinal plane, which includes the longitudinal or roll axis reaching down the center of the aircraft through the nose and empennage, and the plane's yaw axis. Laterally extending element 408 may comprise controls surfaces configured to be commanded by a pilot or pilots to change a wing's geometry and therefore its interaction with a fluid medium, like air. Control surfaces may comprise flaps, ailerons, tabs, spoilers, slats, and the like.

Still referring to FIG. 4, in some embodiments, laterally extending element 408 may include a first laterally extending element 412 and a second laterally extending element 416. In some embodiments, laterally extending element 408 may be split into two parts by fuselage 404. In these cases, first laterally extending element 412 may be the portion of laterally extending element 408 that extends to the right side of aircraft 400 from fuselage 404. In these cases, second laterally extending element 416 may be the portion of laterally extending element 408 that extends to the left side of aircraft 400 from fuselage. In this instance, "right" and "left" are defined with reference to FIG. 4, and determined using the reference frame of a person sitting in the cockpit of aircraft 400 and facing towards the nose of aircraft 400. In some embodiments, first laterally extending element 412 and second laterally extending element 416 are separately connected to fuselage 404. For the purposes of this disclosure, "separately connected" means connected at connection points, wherein the connection points are each in a spatially different location. In some embodiments, first laterally extending element 412 and second laterally extending element 416 may each form an angle of sweep with fuselage 404. The angle of sweep is the angle between a hypothetical line extending perpendicularly from the fuselage, and the leading edge of laterally extending element 408. In some embodiments, the angle of sweep may be 0 degrees. In some embodiments, the angle of sweep may be 30 degrees. In some embodiments, the angle of sweep may be 30-45 degrees. In some embodiments, the angle of sweep may exceed 45 degrees. Generally speaking, an angle of sweep exceeding 45 degrees is used in aircraft designed to operate at high speeds, such as speeds exceeding Mach 0.8, whereas an angle of sweep less than 45 degrees is used in aircraft designed to operate at speeds less than Mach 0.8.

Still referring to FIG. 4, aircraft 400 includes a set of propulsors. Each propulsor of the set of propulsors is electrically connected to the electrical energy source and a generator. The set of propulsors includes at least a lift propulsor 420 and at least a pusher propulsor 424. As used in this disclosure a "propulsor" is a component and/or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. As a further non-limiting example, the propulsor may include a thrust element which may be integrated into the propulsor. The thrust element may include, without limitation, a device using moving or rotating foils, such as one or more rotors, an airscrew, or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward. A propulsor may include a plurality of blades. As used in this disclosure a "blade" is a propeller that converts rotary motion from an engine or other energy source into a swirling slipstream. In an embodiment, blade may convert rotary motion to push the propeller forwards or backwards, with respect to the propulsor. In an embodiment the propulsors include a rotating power-driven hub, to which are attached several radial airfoil-section blades such that the whole assembly rotates about a longitudinal axis. The blades may be configured at an angle of attack. In an embodiment, and without limitation, angle of attack may include a fixed angle of attack. As used in this disclosure an "fixed angle of attack" is fixed angle between the chord line of the blade and the relative wind. As used in this disclosure a "fixed angle" is an angle that is secured and/or unmovable from the attachment point. For example, and without limitation fixed angle of attack may be 2.8° as a function of a pitch angle of 8.1° and a relative wind angle 5.4°. In another embodiment, and without limitation, angle of attack may include a variable angle of attack. As used in this disclosure a "variable angle of attack" is a variable and/or moveable angle between the chord line of the blade and the relative wind. As used in this disclosure a "variable angle" is an angle that is moveable from the attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine the speed of the forward movement as the blade rotates.

With continued reference to FIG. 4, the propulsors may include electric motors. The electric motor may be driven by direct current (DC) electric power and may include, without limitation, brushless DC electric motors, switched reluctance motors, induction motors, or any combination thereof. In some embodiments, the electric motors may be driven using alternating current (AC) electric power. A motor may also include electronic speed controllers or other components for regulating motor speed, rotation direction, and/or dynamic braking. The electric motors may be consistent with any electric motors disclosed in U.S. patent application Ser. No. 16/703,225, filed on Dec. 4, 2019, and titled "AN INTEGRATED ELECTRIC PROPULSION ASSEMBLY" or U.S. patent application Ser. No. 16/938,952, filed on Jul.

25, 2020, and titled "AN INTEGRATED ELECTRIC PROPULSION ASSEMBLY," the entirety of both are hereby incorporated by reference.

In an embodiment, and still referring to FIG. 4, lift propulsor 420 may be configured to provide lift to aircraft 400. As used in this disclosure a "lift" is a perpendicular force to the oncoming flow direction of fluid surrounding the surface. For example, and without limitation relative air speed may be horizontal to electric aircraft, wherein the lift force may be a force exerted in the vertical direction, directing electric aircraft upwards. In some embodiments, each of the at least a lift propulsor 420 may be connected to laterally extending element 408.

Still referring to FIG. 4, aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 4, a number of aerodynamic forces may act upon the electric aircraft during flight. Forces acting on aircraft 400 during flight may include, without limitation, thrust, the forward force produced by the rotating element of the electric aircraft and acts parallel to the longitudinal axis. Another force acting upon aircraft 400 may be, without limitation, drag, which may be defined as a rearward retarding force which is caused by disruption of airflow by any protruding surface of the aircraft 400 such as, without limitation, the wing, rotor, and fuselage. Drag may oppose thrust and acts rearward parallel to the relative wind. A further force acting upon aircraft 400 may include, without limitation, weight, which may include a combined load of the aircraft 400 itself, crew, baggage, and/or fuel. Weight may pull aircraft 400 downward due to the force of gravity. An additional force acting on aircraft 400 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, aircraft 400 are designed to be as lightweight as possible. Reducing the weight of the aircraft and designing to reduce the number of components is essential to optimize the weight. To save energy, it may be useful to reduce weight of components of aircraft 400, including without limitation propulsors and/or propulsion assemblies.

Still referring to FIG. 4, the at least a propulsor of aircraft 400 may include at least a pusher propulsor 424. As used in this disclosure a "pusher propulsor" is a flight component that is mounted such that the component generates forward thrust through the medium. Pusher propulsor 424 may be configured to provide forward thrust to aircraft 400. As a non-limiting example, pusher propulsor 424 may include a pusher flight component such as a pusher propeller, a pusher motor, a pusher propulsor, and the like. Additionally, or alternatively, pusher propulsor 424 may include a plurality of pusher propulsors. Additionally, or alternatively pusher propulsor 424 may include multiple pusher propulsors 424. In some embodiments, the at least a pusher propulsor 424 may be attached to the back of fuselage 404. In FIG. 4, pusher propulsor 424 is attached to the back of fuselage 404.

Figure 5:
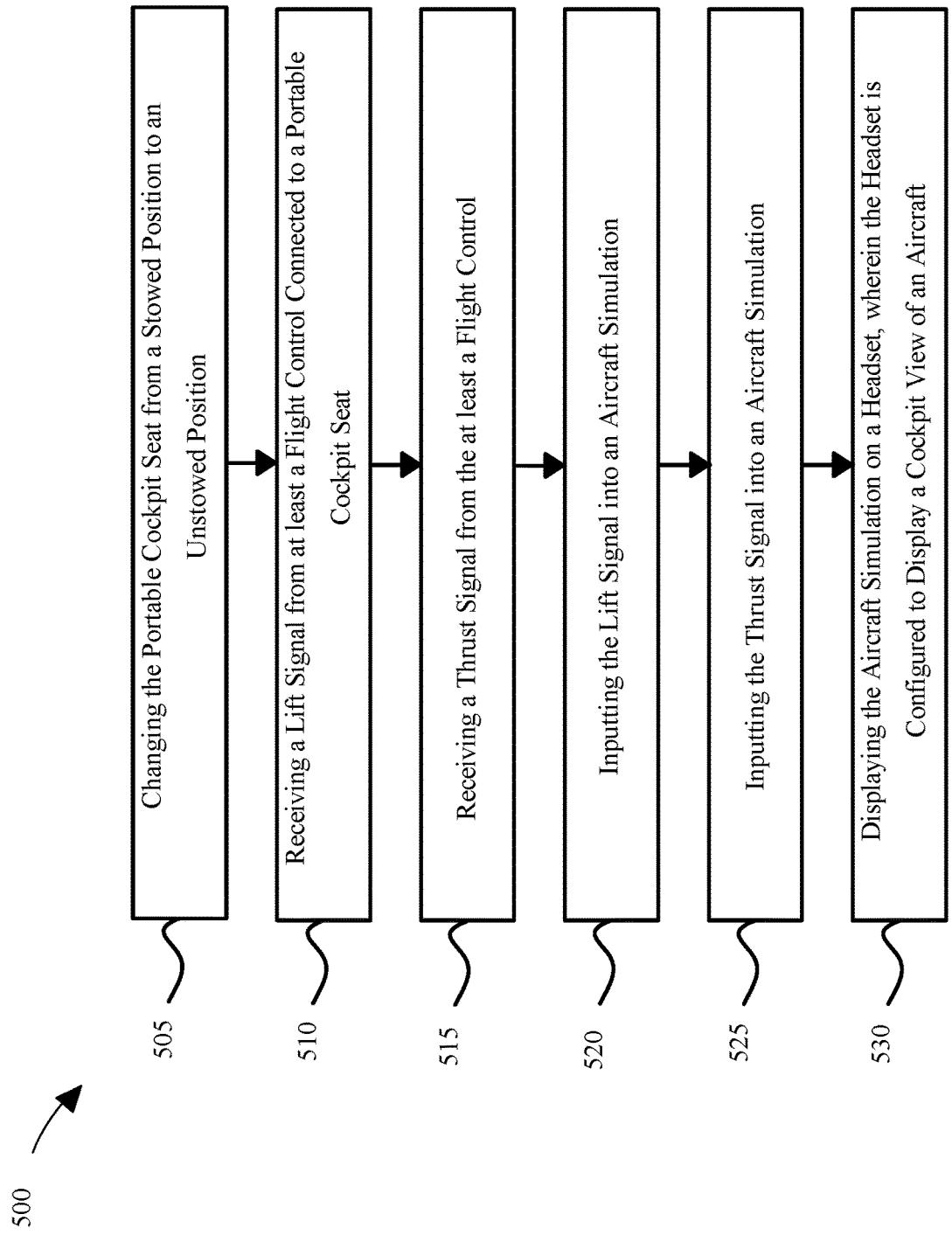
FIG. 5 is a flow chart of an exemplary method for a portable cockpit seat.

Referring now to FIG. 5, an exemplary embodiment of a method for a portable cockpit seat is illustrated. Method 500 may be implemented, without limitation, as described above with reference to FIGS. 1-4. Method 500 includes a step 505 of changing the portable cockpit seat from a stowed position to an unstowed position. The stowed position may be consistent with any stowed position of the portable cockpit seat disclosed as part of this disclosure. The unstowed position may be consistent with any unstowed position of the portable cockpit seat disclosed as part of this disclosure. In some embodiments, method 500 may include a step of changing the portable cockpit seat from an unstowed position to a stowed position. Method 500 furthermore includes a step 510 of receiving a lift signal from at least a flight control connected to a portable cockpit seat. The lift signal may be consistent with any lift signal disclosed as part of this disclosure. The flight control may be consistent with any flight control disclosed as part of this disclosure. The portable cockpit seat may be consistent with any portable cockpit seat disclosed as part of this disclosure. The lift signal is caused by actuation of the at least a flight control by a user.

With continued reference to FIG. 5, method 500 includes a step 515 of receiving a thrust signal from the at least a flight control, wherein the thrust signal is caused by actuation of the at least a flight control by the user. The thrust signal may be consistent with any thrust signal disclosed as part of this disclosure.

With continued reference to FIG. 5, method 500 includes a step 520 of inputting the lift signal into an aircraft simulation. The aircraft simulation may be consistent with any aircraft simulation disclosed as part of this disclosure. In some embodiments, the aircraft simulation may be carried out on a computing device consistent with any computing device disclosed as part of this disclosure.

With continued reference to FIG. 5, method 500 includes a step 525 of inputting the thrust signal into an aircraft simulation. Method 500 includes a step 530 of displaying the aircraft simulation on a headset, wherein the headset is configured to display a cockpit view of an aircraft, wherein the movement of the aircraft is a result of the aircraft simulation. The headset may be consistent with any headset disclosed as part of this disclosure. The cockpit view may be consistent with any cockpit view disclosed in this disclosure. Aircraft may be consistent with any aircraft disclosed as part of this disclosure. In some embodiments, aircraft may be a simulated aircraft. In some embodiments, aircraft may be a real-life aircraft. In some embodiments, the cockpit view may include a first portion, including a view of the at least a flight control, and a second portion, including a simulated exterior view. The first portion may be consistent with any first portion disclosed as part of this disclosure. The second portion may be consistent with any second portion disclosed as part of this disclosure. The view of the at least a flight control may be consistent with any view of the at least a flight control disclosed as part of this disclosure. The simulated exterior view may be consistent with any simulated exterior view disclosed as part of this disclosure. In some embodiments, the at least a flight control may comprise an inceptor stick. The inceptor stick may be consistent with any inceptor stick disclosed as part of this disclosure. In some embodiments, the inceptor stick includes a joystick and is configured to control the aircraft's movement in the forward and transverse directions. The joystick may be consistent with any joystick disclosed as part of this disclosure.

Figure 6:
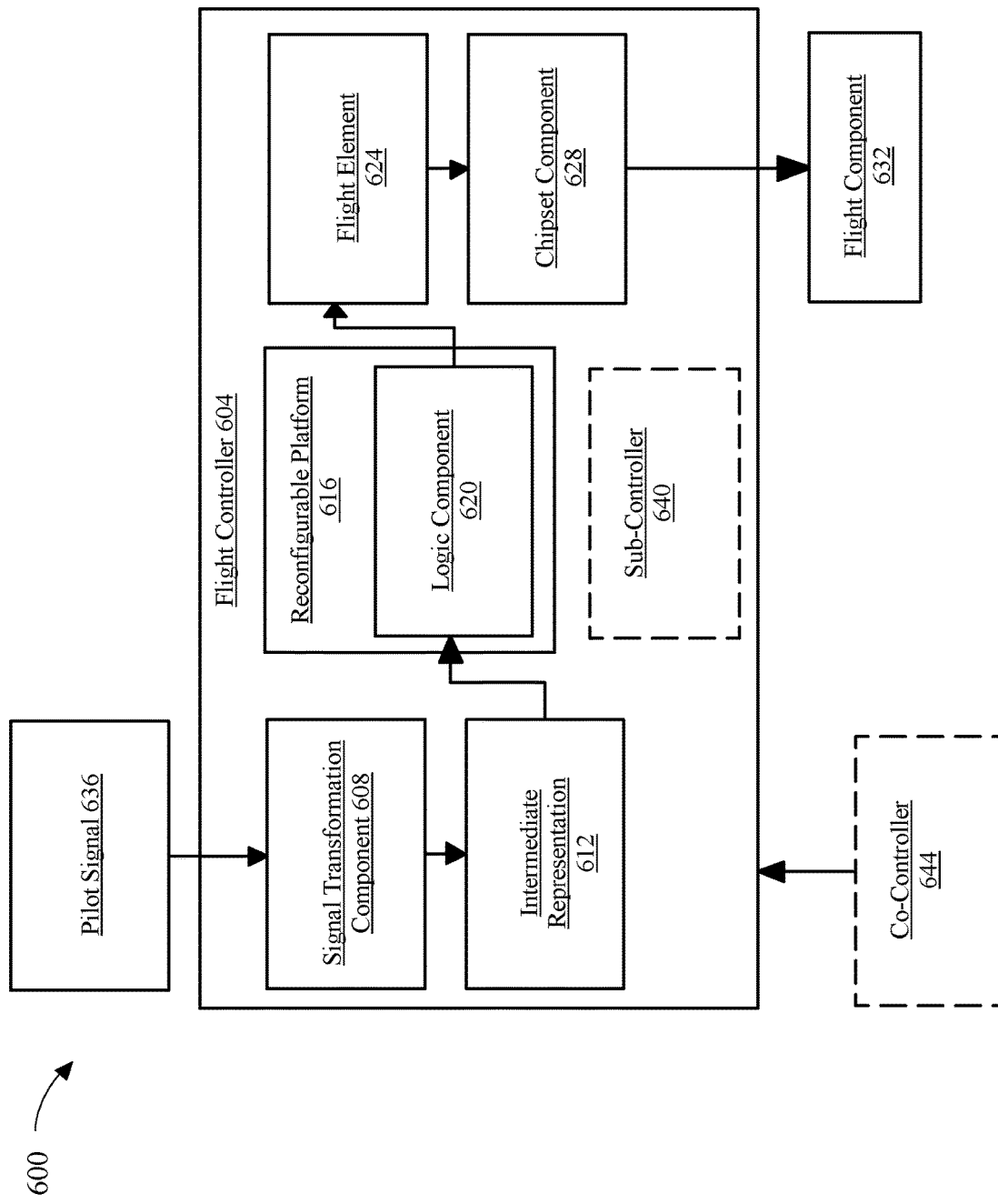
FIG. 6 is a diagram of an exemplary flight controller.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
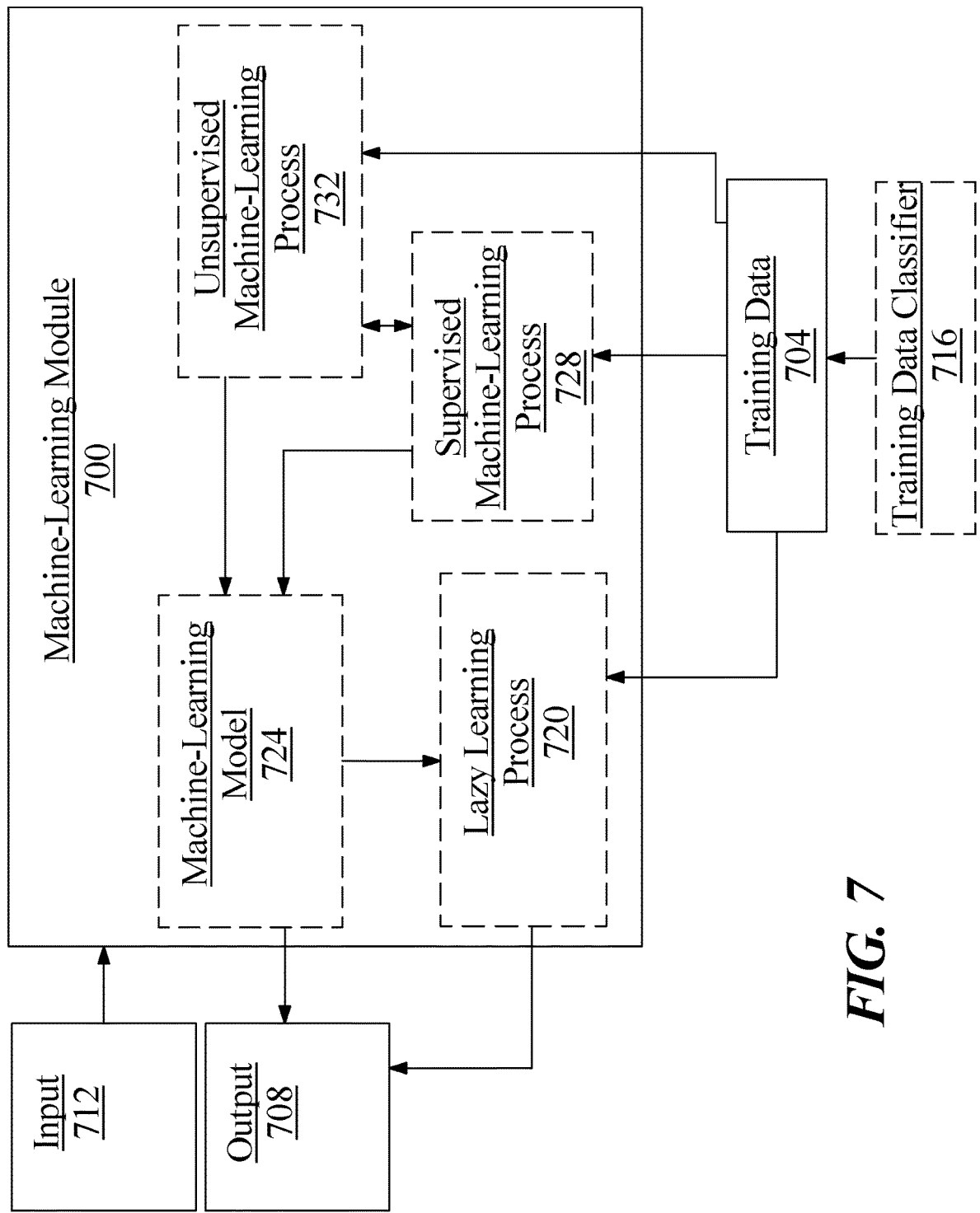
FIG. 7 is a diagram of an exemplary machine learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example flight elements and/or pilot signals may be inputs, wherein an output may be an autonomous function.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to sub-categories of flight elements such as torques, forces, thrusts, directions, and the like thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
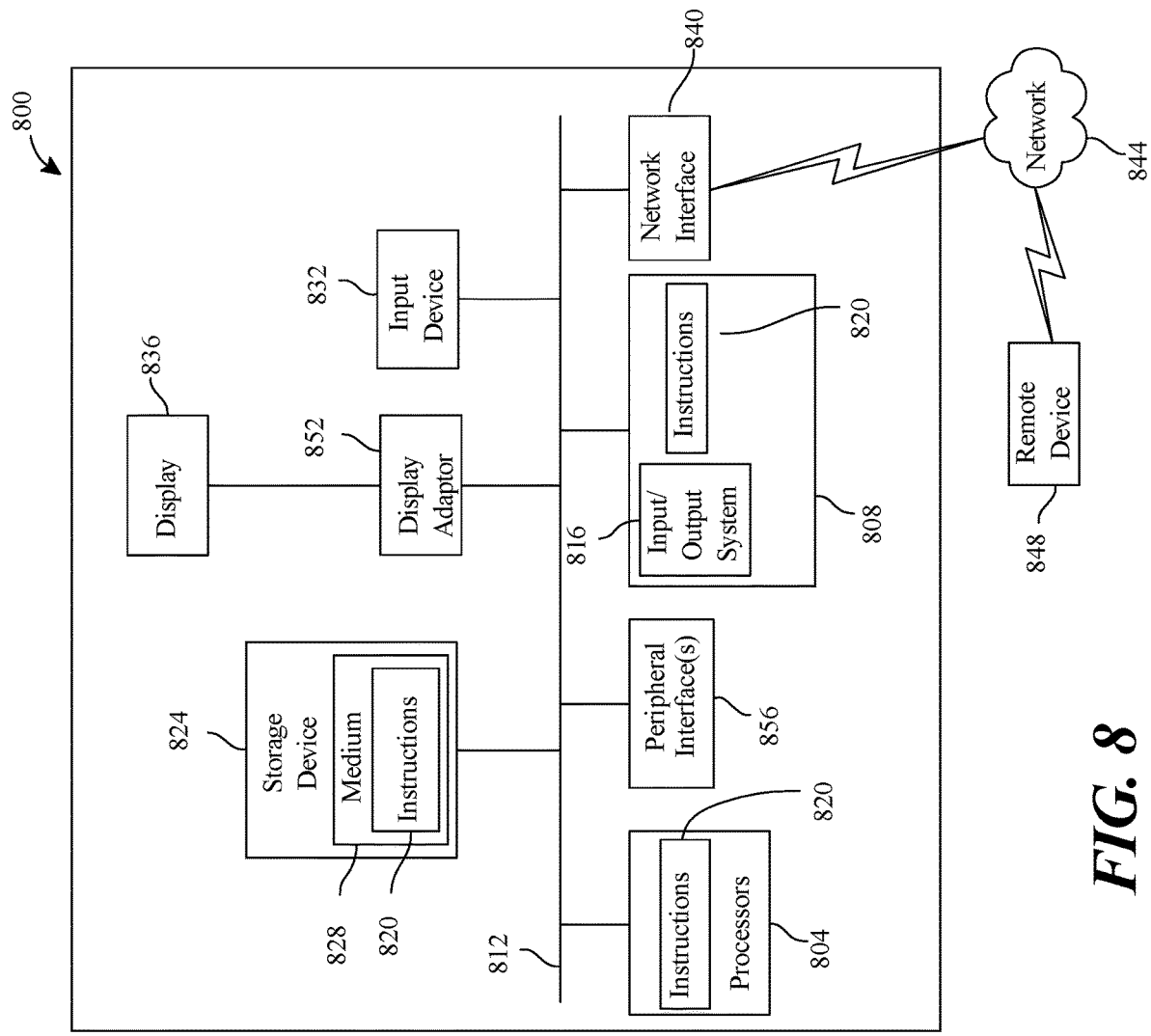
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus, comprising:
   a telescoping frame connecting a portable cockpit seat and a set of yaw pedals, the telescoping frame configured to cause a reduction in size of a collapsible section of the frame between the set of yaw pedals and the portable cockpit seat;
   the portable cockpit seat including a hinge, wherein the portable cockpit seat has a stowed position in which the portable cockpit seat is folded about the hinge and the collapsible section of the frame is reduced in size;
   a headset comprising a display configured to display a cockpit view of an aircraft; and
   a flight control, the flight control being communicatively connected to the headset, wherein:
   the flight control, in response to actuation by a user, is configured to:
   send a thrust signal, wherein the thrust signal causes the aircraft to alter its thrust, or
   send a lift signal, wherein the lift signal causes the aircraft to alter its lift.

2. The apparatus of claim 1, wherein the frame including a frame hinge, the frame hinge allowing the set of yaw pedals to fold toward the portable cockpit seat.

3. The apparatus of claim 1, wherein the cockpit view comprises: a first portion comprising a view of the flight control received from a camera; and a second portion comprising a simulated exterior view.

4. The apparatus of claim 1, wherein the flight control includes a propulsor blade pitch control, wherein the propulsor blade pitch control is configured to change a pitch angle of a blade on a lift propulsor.

5. The apparatus of claim 1, wherein the flight control comprises an inceptor stick and a lift lever, wherein the lift lever comprises a thrust dial, and wherein:
   the inceptor stick is configured to control a movement of the aircraft in forward and transverse directions;
   rotating the thrust dial of the lift lever in a first direction causes a thrust of the aircraft to increase; and
   rotating the thrust dial of the lift lever in a second direction causes the thrust of the aircraft to decrease.

6. The apparatus of claim 1, wherein the flight control comprises a lift lever, the lift lever comprising a pivot point, wherein:
   rotating the lift lever in a first direction causes a speed of a lift propulsor of the aircraft to increase; and
   rotating the lift lever in a second direction causes the speed of the lift propulsor of the aircraft to decrease.

7. The apparatus of claim 6, wherein the lift lever comprises a thrust dial, wherein:
   rotating the thrust dial of the lift lever in a first direction causes the thrust of the aircraft to increase; and
   rotating the thrust dial of the lift lever in a second direction causes the thrust of the aircraft to decrease.

8. The apparatus of claim 1, further comprising an adjustment device controlling a distance between the portable cockpit seat and the set of yaw pedals.

9. The apparatus of claim 1, further comprising a computing device communicatively connected to the headset and the flight control, the computing device configured to:
receive the lift signal or the thrust signal from the flight control; and
input the lift signal or the thrust signal into an aircraft simulation.

10. The apparatus of claim 9, wherein the computing device is further configured to display the aircraft simulation on the headset.

11. The apparatus of claim 1, wherein the thrust signal from the flight control causes a pusher propulsor of a simulated aircraft to alter its rotation speed.

12. The apparatus of claim 1, wherein the lift signal from the flight control causes an at least a lift propulsor of a simulated aircraft to alter its rotation speed.

13. The apparatus of claim 1, wherein the flight control is removably connected to the portable cockpit seat.

14. The apparatus of claim 1, wherein the flight control comprises at least two flight controls.

15. A method comprising:
changing a portable cockpit seat from a stowed position to an unstowed position,
wherein the portable cockpit seat is attached to a telescoping frame connecting the portable cockpit seat to a set of yaw pedals, the telescoping frame configured to cause a reduction in size of a collapsible section of the frame between the set of yaw pedals and the portable cockpit seat, and
wherein changing the portable cockpit seat from the stowed position to the unstowed position includes unfolding the portable cockpit seat about a hinge and extending the collapsible section;
inputting a lift signal from a first flight control connected to the portable cockpit seat into an aircraft simulation, wherein the lift signal is caused by actuation of the first flight control by a user;
inputting a yaw signal, from the set of yaw pedals into the aircraft simulation;
inputting a thrust signal from a second flight control into the aircraft simulation, wherein the thrust signal is caused by actuation of the second flight control by the user; and
displaying the aircraft simulation on a headset comprising a mixed reality headset configured to display environments comprised of virtual reality components overlayed on a video feed from a camera, wherein the headset is configured to display a cockpit view of an aircraft, wherein movement of the aircraft in the aircraft simulation is a result of the aircraft simulation.

16. The method of claim 15, wherein the cockpit view comprises:
a first portion, comprising a view of the first flight control or the second flight control from the camera; and
a second portion, comprising a simulated exterior view.

17. The method of claim 15, wherein the frame includes a frame hinge, and changing the portable cockpit seat from the stowed position to the unstowed position includes unfolding the set of yaw pedals away from the portable cockpit seat.

18. The method of claim 15, further comprising:
receiving a pitch angle signal from a propulsor blade pitch control; and
inputting the pitch angle signal into the aircraft simulation.

19. The method of claim 15, further comprising:
adjusting a distance between the set of yaw pedals and the portable cockpit seat in response to actuation of an adjustment device connected to the frame.

* * * * *